(No Model.) 5 Sheets—Sheet 1.

W. H. ABBOTT.
SPEED INDICATOR.

No. 487,702. Patented Dec. 13, 1892.

Witnesses.
A. B. Broderick
J. Millard

Inventor
William H. Abbott,
By his Attorney
Charles G. C. Simpson (No Model.) 5 Sheets—Sheet 2.

W. H. ABBOTT.
SPEED INDICATOR.

No. 487,702. Patented Dec. 13, 1892.

Witnesses.
A. Broderick
J. Millard

Inventor.
William H. Abbott,
By his Attorney
Charles G. C. Simpson (No Model.)  5 Sheets—Sheet 3.

W. H. ABBOTT.
SPEED INDICATOR.

No. 487,702. Patented Dec. 13, 1892.

Witnesses.
Inventor.

(No Model.) 5 Sheets—Sheet 4.

W. H. ABBOTT.
SPEED INDICATOR.

No. 487,702. Patented Dec. 13, 1892.

Witnesses.
A. A. Thompson
J. Millard

Inventor.
Wm. H. Abbott
By his Attorney
Charles &c.

(No Model.)　　　　　　　　　　　　　　　　　　5 Sheets—Sheet 5.
W. H. ABBOTT.
SPEED INDICATOR.
No. 487,702.　　　　　　　　　　　　　Patented Dec. 13, 1892.
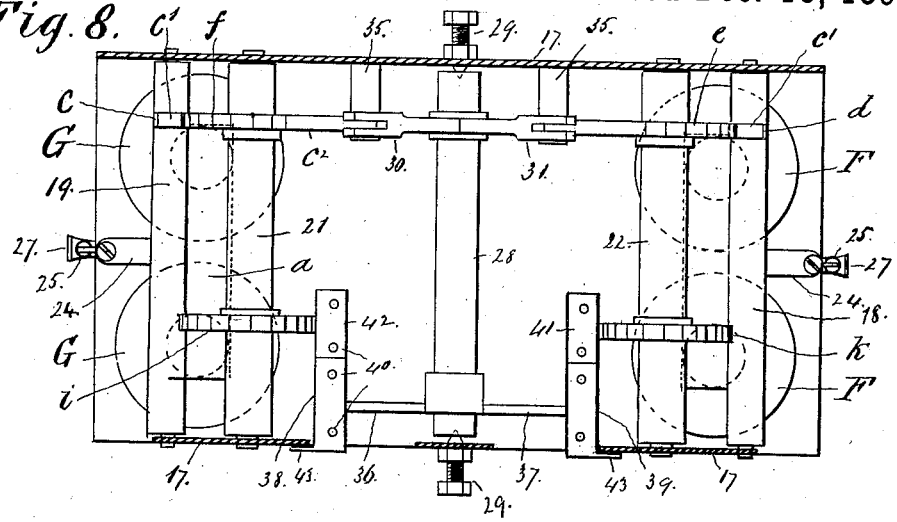
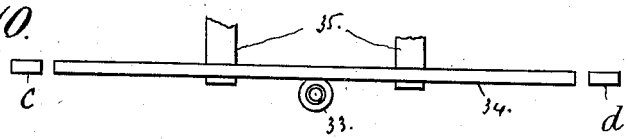
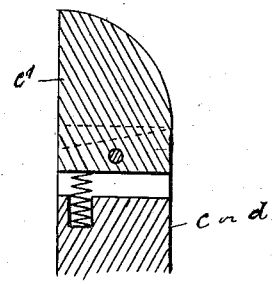
Witnesses　　　　　　　　　　　　　　Inventor.

UNITED STATES PATENT OFFICE.

WILLIAM HARVEY ABBOTT, OF LENNOXVILLE, CANADA.

SPEED-INDICATOR.

SPECIFICATION forming part of Letters Patent No. 487,702, dated December 13, 1892.

Application filed August 12, 1891. Serial No. 402,485. (No model.)

*To all whom it may concern:*

Be it known that I, WILLIAM HARVEY ABBOTT, a subject of the Queen of Great Britain, residing at Lennoxville, in the county of Sherbrooke and Province of Quebec, Canada, have invented new and useful Improvements in Speed-Indicators; and I do hereby declare that the following is a full, clear, and exact description of the same.
This invention relates to improvements in mechanism for indicating the speed of cars, locomotive-engines, or other vehicles in motion; and the object of my improvements is to do the above in a more suitable manner and in one which will indicate the speed of the car, &c., in miles per hour upon a scale at any desired time by putting the mechanism into operation. I attain the said object by the mechanism illustrated in the accompanying drawings, in which similar letters and numerals of reference indicate like parts.

Figure 1:
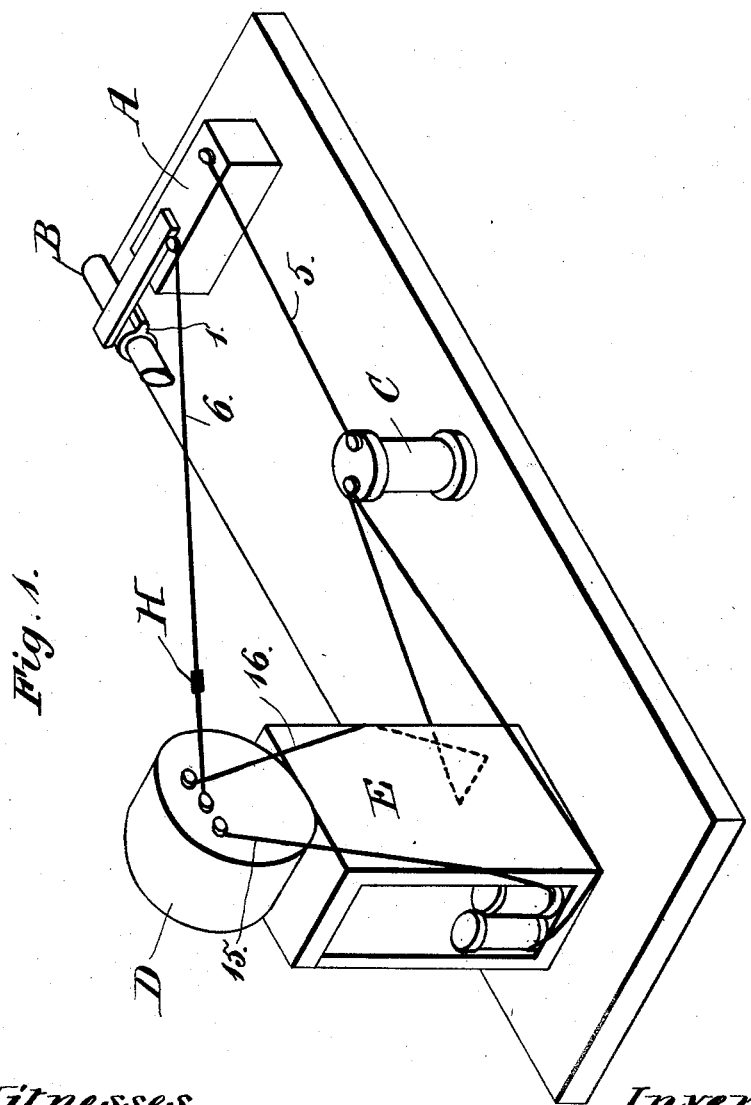
Figure 2:
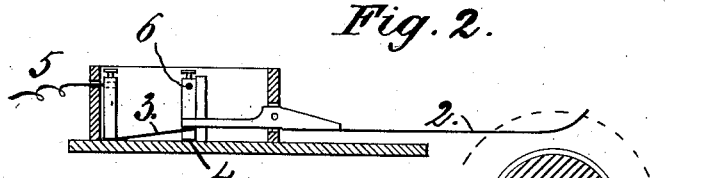
Figure 3:
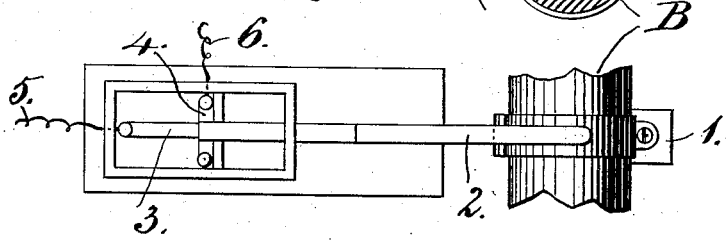
Figure 4:
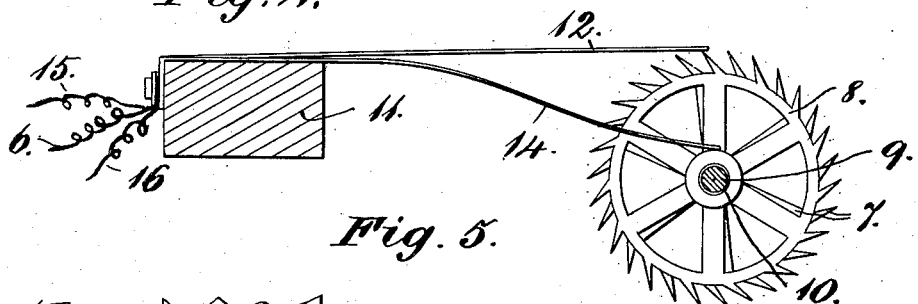
Figure 5:
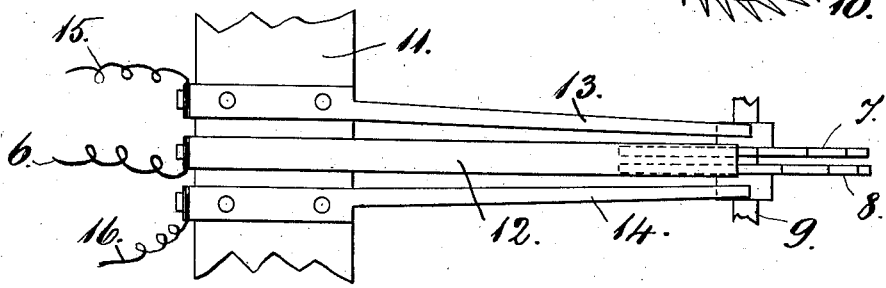
Figure 6:
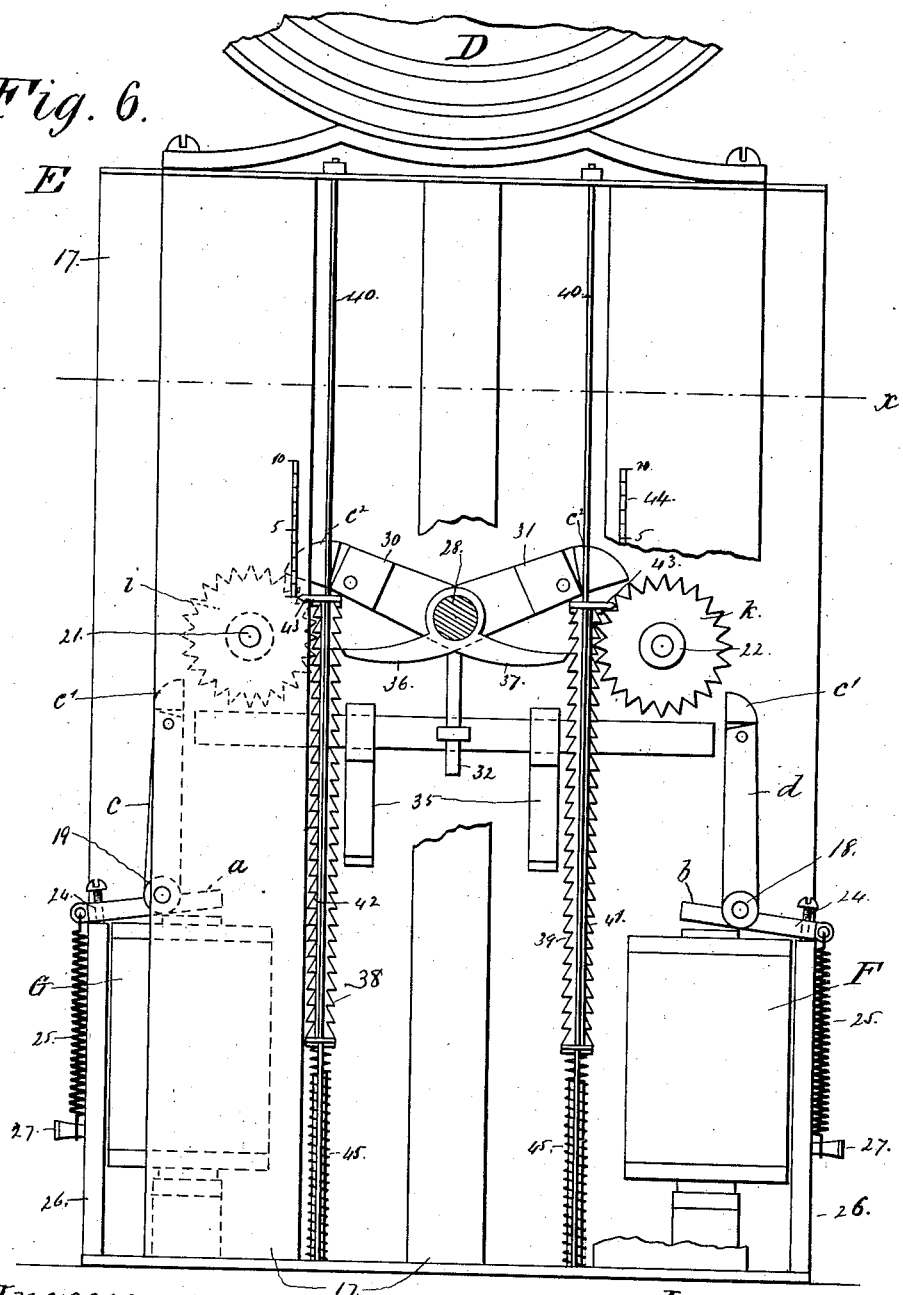
Figure 7:
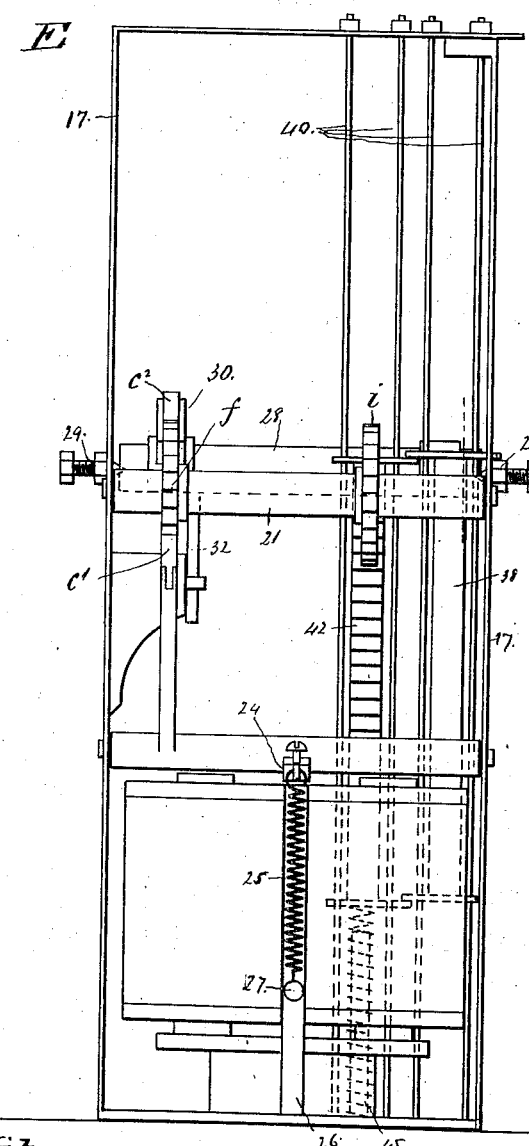
Figure 11:
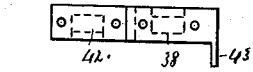
Figure 12:
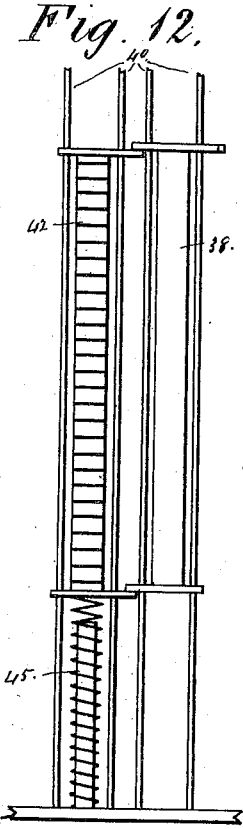

Figure 1 is a rough diagram illustrating the relation of the parts of my improvements to each other and the arrangement of an electrical circuit therewith. Fig. 2 is a vertical section view of the mechanism by which the circuit is made and broken at each revolution of the wheels and axle of the car, &c., with which it is put in connection. Fig. 3 is a plan of the mechanism shown in Fig. 2. Fig. 4 is an elevation of a switching device by which the current of electricity is switched from one set of electro-magnets to another for equal amounts of time. Fig. 5 is a plan of the device shown in Fig. 4. Fig. 6 is a front elevation of the indicator with section of rock-shaft 28, which is taken on line $x'$, Fig. 7. Fig. 7 is a side elevation of the indicator. Fig. 8 is a plan of the lower part of the indicator, a section of the framework being taken on line $x$, Fig. 6. Fig. 9 is a detail showing a section of one of the arms $c$ and $d$ and ratchet-pawl spring on an enlarged scale. Fig. 10 is a plan view of the slide-bar
34. Fig. 11 is a plan of racks 38 and 42. Fig. 12 is an elevation of racks 38 and 42.

Letter A designates the "circuit-maker." I so call it because by it the circuit is made and broken at each revolution of the wheels and axle it is put in connection with. It is shown in outline in Fig. 1 and more particularly in Figs. 2 and 3.

On the axle B, which is that of the wheels the speed is to be indicated by, is formed or attached a projection 1.
The circuit-maker B is attached to the car, &c., in any convenient position, so that the lever 2 may be operated by the projection 1 and cause the inner end to press down the spring 3 upon the plate 4 each time the projection 1 strikes the lever 2. This forms the electrical connection which completes the circuit during the contact, the spring 3 being electrically connected with the wire 5 and the plate 4 with the wire 6. The wire 5 connects with the positive pole of a battery C, which may be situated in any convenient location on the car, &c., and may be of any ordinary kind of battery. The wire 6 connects with a clock D, which for convenience is located on the top of the indicator E, but may be otherwise placed, if desired. The said clock has what is known as an "ordinary watch-movement," and on any of its pinions the switching mechanism is formed; but I prefer to use the pinion next the escapement, which is represented by the pinion 9. On this are secured the escapement-wheels 7 and 8, an insulator 10 being placed so as to insulate them from the pinion 9, and if they are not sufficiently far apart to not require it they must be insulated from each other.

In attaching the wheels 7 and 8 on the pinion care must be taken to have the teeth of the one exactly intermedially situated in their revolution with the teeth of the other.

11 is an insulated attachment of the frame, upon which a spring-arm 12 is attached. With this the circuit-wire 6 is connected, so that as the wheels 7 and 8 are revolved by the pinion 9 in the operation of the clock their teeth come in contact alternately for equal spaces of time with the arm 12, and are therefore in circuit alternately. If pinion 9 is the pinion next the escapement of the clock mechanism, the wheels 7 and 8 will be alternately in and out of circuit for two seconds each. On the same attachment 11 two arms 13 and 14 are secured. These form continuations of the circuit and connect with wires 15 and 16, which are connected with a pair of electro-magnets F and another pair G, situated, as shown, on each side of the indicator E, which magnets are therefore alternately placed in and out of circuit for equal spaces of time—say two seconds.

H is any ordinary switch or circuit breaker situated on any wall or portion of the car, &c., for breaking the circuit when the indicator is not required, and thus save it from continuous operation.

Having, as above described, the circuit and shown the arrangement by which the two pairs of magnets F and G are alternately operated, we now come to the indicator E, which consists of a framework 17, in which the said electro-magnets are attached in the ordinary way. Over these are situated the rock-shafts 18 and 19, having armatures $a$ and $b$, and are further provided with arms $c$ and $d$, provided at their extremities with spring-pawls $c'$ to assist them to disengage freely from the teeth of the wheels $e$ and $f$, which are secured on shafts 21 and 22. On these are also secured the ratchet-wheels $i$ and $k$, so that by the alternate action of the arms $c$ and $d$ the wheel $f$ $i$ and shaft 21 and the wheels $e$ $k$ and shaft 22 are alternately operated or rotated, the arms being returned to an upright position by providing the rock-shafts 18 and 19 with projections 24, to which are attached springs, one end of each of which is attached to a projection 27 of standards 26 and the other end of the springs to an eye formed on each projection 24, set-screws being provided in the projections 24, as shown, to govern the amount of the return stroke.

28 is a rock-shaft carried by center bearings 29. This is provided with arms 30 and 31, having spring-pawls $c^2$ at their ends, the arms being so adjusted that the moment the pawl of arm 30 is disengaged from wheel $f$ the pawl of arm 31 engages with wheel $e$, and vice versa. The rock-shaft is operated by an arm 32, the end of which is received within an eye 33, formed on a slide-bar 34, carried in brackets 35, which also serve as guides to the said bar, the bar being so situated that it is moved alternately from side to side a small amount by the arms $c$ and $d$ at the first stroke of either of them. In the front part of the rock-shaft 28 two arms 36 and 37 are provided, adapted to engage with the teeth of two racks 38 and 39, being so adjusted in length and position that as soon as the arm 36 disengages from the rack 38 the arm 37 engages with the rack 39, and vice versa. On each side in the position shown are four tension guide-rods 40. Two of these form guide-rods to the four racks 38, 39, 41, and 42, the rack 41 being held in the proper position to engage with the teeth of the wheel $k$ and the rack 42 to engage with the teeth of the wheel $i$. All the racks are provided with largely-elongated heads, and the heads of the racks 41 and 42 extend under those of the racks 38 and 39, so that when the rack 42 is raised by the wheel $i$ the rack 38 will be raised by it, and the same with racks 41 39 and wheel $k$. To the heads of the racks 38 and 39 are attached fingers which point to scales 44, marked on or attached to the front of the framing 17. The method of graduating these scales will be hereinafter described. On standards placed below the racks 41 and 42 are supported spiral springs 45 to receive and soften the concussion of the fall of the racks.

Having hereinabove fully described how the magnets F and G are alternately operated, I will now describe the operation of the indicator E by the magnets. With the mechanism in the position shown in Figs. 6, 7, and 8, I will suppose that the magnets F are the first to come into operation and that the shaft B is making any number of revolutions (say three) in the given time of said action of the magnets, (call it two seconds.) Therefore in the first action of two seconds of the magnets F the magnets and spring 25 will cause the arm $d$ to operate the wheel $e$ three times or move it round the amount of three teeth, one at each stroke. At the first stroke only the arm $d$ moves over the slide-bar 34 a little to the left, causing the pawl of the arm 31 to engage with the teeth of the wheel $e$ and clearing the pawl of the arm 30 from the teeth of the wheel $f$. At the same time it also engages the arm 36 with rack 38 and disengages arm 37 from the rack 39 and revolves the shaft 22 and wheels $e$ $k$ the amount of one tooth. The pawl of the arm 31 prevents the wheel from reverse revolution, as the arm $d$ moves back by the spring 25. This causes the rack 41, and with it the rack 39, to be raised the amount of one tooth. At each of the other two strokes (or more strokes if such are made) the same operation is performed, only that the slide-bar 34 and rock-shaft 28 and attachments thereof remain stationary the while. As hereinabove described, the magnets F are now thrown out of circuit and those G come into circuit, which puts the arm $c$ in operation by similar means as those by which the arm $d$ is operated. At the first stroke of the arm $c$ it moves the slide-bar 34 to the right (or back again) and engages the pawl of the arm 30 with the wheel $f$ and the arm 37 with the rack 39. At the same time it disengages the arm 36 from rack 38. The arm 31, with its pawl, being disengaged from the wheel $e$, the rack 41 being unsupported, falls by gravity, revolving the shaft 22 and its wheels the reverse way. The rack 39 is suspended at the height to which it has been raised by the arm 37, which is now fully engaged with it for the time that the magnets G are in operation, thus giving time to read off the pointing of the hand 43 on the scale 44; but when, however, the magnets F are again brought into circuit and the rock-shaft is again moved it falls by reason of the withdrawal of the arm 37 and the engagement of the arm 36 with rack 38 during the period of time that the magnets F are again brought into circuit. Thus the speed is alternately indicated for an equal space of time by each of the hands 43 and scales 44, there being one of each on each side.

I will now describe how the scales 44 are to be marked or graduated. Having the circumference of the wheels attached to axle B, we are able to calculate the speed of the train per hour if we know the number of revolutions made in a given amount of time. Now I will suppose the circumference of the wheels to be such that at two and a half revolutions per two seconds the speed will be one and a half miles per hour. Therefore at five revolutions per two seconds you will have a speed of three miles per hour. Therefore the length of five teeth marked on the scale 44 will represent three miles per hour, and the length of ten teeth of the racks marked upon the scale will represent six miles per hour, and so on. The three or the six being divided into a corresponding number of equal parts and marked upon the scale, each part will represent a mile an hour. Thus three parts will represent three and four parts four miles per hour. These divisions may be further numbered, as shown, "5," "10," "15," &c., or in any other way desired, so that the eye may more readily catch the amount indicated by the fingers. In like manner a scale may be graduated for any circumference of wheel and for any space of time by which to show the speed per hour.

What I claim is as follows:

1. The combination, with a pair of wheels and axle of a car, &c., of a circuit maker and breaker adapted to make and break the circuit at each revolution of the wheels and axle, with an electric circuit, and with a clock mechanism having a switching mechanism by which two sets of electro-magnets are alternately brought into and placed out of circuit, the indicator mechanism E, of which said magnets form part, by which the revolutions within a given amount of time will be indicated in miles per hour by fingers 43 and scale 44, the whole substantially as described.

2. The combination, with a pair of wheels and axle of a car, &c., of the mechanism A, adapted to make and break an electric circuit at each revolution of the wheels and axle, with an electrical circuit, and with a clock having a watch-movement provided with a switching device, consisting of the pinion 9, insulated wheels 7 and 8, and arms 12, 13, and 14, adapted to actuate two pairs of electro-magnets alternately, the whole substantially as described.

3. The combination, in an indicator E, of the magnets F and G, actuated alternately, as described, for equal periods of time, rock-shafts 18 and 19, having armatures $a$ and $b$, and springs 25, whereby they are rotated, also having arms $c$ and $d$, provided with spring-pawls $c'$, shafts 21 and 22, having, respectively, wheels $f$ $i$ and $e$ $k$, adapted to be operated by the arms $c$ and $d$, rock-shaft 28, having arms 30 and 31, adapted to act upon the wheels $e$ and $f$, and also having arms 36 and 37, racks 41 and 42, adapted to be actuated by the wheels $i$ and $k$, racks 38 and 39, adapted to be actuated by the racks 41 and 42 and retained by the arms 36 and 37, fingers 43, attached to the heads of racks 38 and 39, and scales 44, graduated to show the speed per hour, the whole substantially as described.

WILLIAM HARVEY ABBOTT.

Witnesses:
C. S. HENRY,
C. J. LANE.